Dec. 3, 1957 A. N. ORMOND 2,815,456

SYNCHRONIZING SIGNAL GENERATOR

Filed March 19, 1956

INVENTOR.
ALFRED N. ORMOND
BY Elliott & Pastoriza
ATTORNEYS

United States Patent Office 2,815,456

Patented Dec. 3, 1957

2,815,456

SYNCHRONIZING SIGNAL GENERATOR

Alfred N. Ormond, Inglewood, Calif.

Application March 19, 1956, Serial No. 572,529

3 Claims. (Cl. 307—107)

Figure 1:
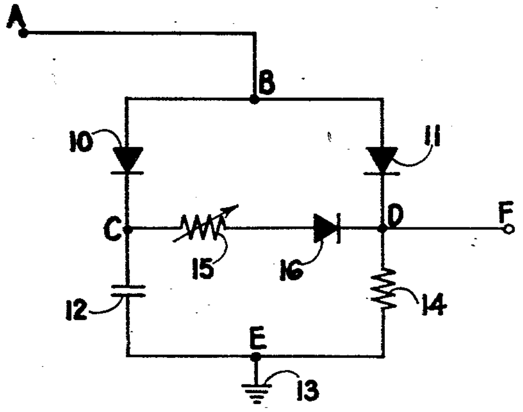

This invention relates generally to electrical circuits, and more particularly to a circuit for generating pulses in time phase with a periodic input signal.

Certain type of wave shaping circuits for generating pulses from input signals are well known in the art. For example, the generation of a series of square wave pulses may be obtained from a sine wave input by simply amplifying the sine wave and then clipping the amplified wave to provide a substantially square wave output. Similarly, in the event it is desired to provide a series of pulses corresponding substantially to the peak values of a sine wave, the sine wave may be fed directly into a tube biased such that only the peak portions of the input sine wave to the grid are sufficient to raise the bias above the cut-off value. By this arrangement, the tube will only conduct for short periods during the peak portions of the sine wave thereby yielding a series of short pulses.

One of the unavoidable disadvantages in wave shaping or synchronizing signal generating circuits of the above types is the tendency for control voltages, such as control voltages in amplifiers, and bias voltages on clipping tubes, to drift or change their D.-C. levels with respect to ground. Further, the effectiveness of the particular circuit oftentimes depend upon the amplitude of the input wave form. For example, in the case of the generation of pulses corresponding in time phase to the peak values of a sinusoid, should the overall amplitude of the input sine wave decrease for a short period, it is possible that none of the peaks during such period will be sufficient to overcome the bias. Similarly, the bias control voltage itself may drift to a negative value greater than the peak value of the incoming wave.

Bearing the above in mind, it is a primary object of the present invention to provide an improved synchronizing pulse generating circuit in which variations in the absolute level of control voltages or variations in the amplitude of an input signal will not affect appreciably the formation of the desired pulses.

More particularly, an object is to provide a synchronizing signal generator for generating a series of pulses corresponding substantially exactly in time phase with the peak voltage values of a periodic input wave.

Still another object is to provide a synchronizing pulse generator of the above type in which the pulses may be used in a gating circuit to provide an indication of the actual peak voltage values which are attained by the original input signal.

Another more general object is to provide a sub-circuit useful in a circuit for chopping up a wave form so that only desired discrete portions of the wave form are reproduced.

These and other objects and advantages of the present invention are attained by providing a simplified electrical network in which pulses are generated in response to an input wave by employing a control voltage derived from the input wave itself. As a consequence, changes in the amplitude of the input wave result in corresponding changes in the control voltage so that the characteristics of the output series of pulses remain relatively unchanged.

Figure 2:
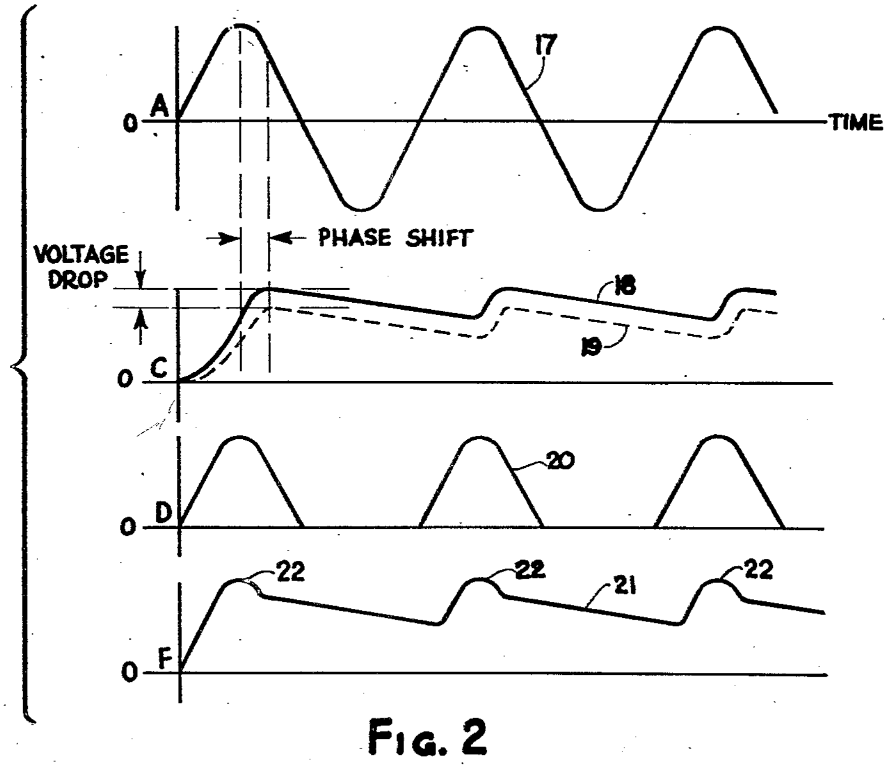

The electrical network for accomplishing this control together with its various advantages and uses can best be understood by referring to the accompanying drawings, in which:

Figure 1 is a schematic diagram of a preferred embodiment of the circuit of this invention; and, Figure 2 illustrates a series of wave forms illustrating the voltage conditions of various points in the circuit of Figure 1.

Referring first to Figure 1, the circuit comprises an input terminal A connected to a junction point B which in turn connects to the input of first and second rectifier means 10 and 11. The output of the rectifier 10 connects to a junction point C and thence to one side of a condenser 12, the other side of which passes to a junction point E and ground at 13. The output of the rectifier means 11 connects to a junction point D and thence to a resistance 14, the other side of which is similarly connected to the junction point E and ground at 13 as shown.

A variable resistance 15 and third rectifier means 16 are connected together in series between junction points C and D. The output signal is taken from across the resistance 14 at the terminal F.

In explaining the operation of the circuit of Figure 1, reference is now had to Figure 2 which illustrates, in the top graph, a periodic input signal 17 in the form of a sine wave. This input signal 17 when applied to the input terminal A passes through both the rectifiers 10 and 11 to the junction points C and D respectively. The rectified positive portions of the sine wave at the point C charge up the condenser 12. During the negative portions of the input sine wave 17, the condenser 12 slowly discharges through the variable resistance 15, rectifier 16, and resistance 14 to ground at 13. This discharge is blocked from passing to junction point B and input terminal A by the rectifiers 10 and 11. The rate of discharge of the condenser 12 is determined by the time constant established by the values of the condenser 12, resistance 15, and resistance 14. Ordinarily resistance 14 is of a relatively high value so that the time constant for the network is relatively long compared to the period of the input signal 17.

In Figure 2 the wave form 18 represents the potential of the point C as a result of the initial charging up of the condenser 12 and the slow discharge thereof during the negative half cycle portions of the input signal. As indicated in Figure 2, the peak voltage points at C are shifted in phase from the peak voltage points of the input sine wave 17 by an amount determined by the resistance of the rectifier 10 and the capacitance of the condenser 12, as well as the frequency of the input signal. It will be noted from the wave form 18 that the discharge of the condenser 12 is relatively small before it is again raised to a peak value by the next successive positive cycle of the input signal 17.

After the wave form 18 passes through the variable resistance 15 and rectifier 16 its amplitude is lowered by a voltage drop determined by the combined resistances of resistance 15 and rectifier 16 so that the wave form at the point D as a result of the signal 18 alone, will appear as indicated in the dotted line wave form 19. Note that wave form 19 is essentially the same in shape as wave form 18 except that it is of a lesser magnitude. This voltage drop or decrease in amplitude of the wave form 18 to the wave form 19 may be adjusted by changing the value of the variable resistance 15.

Consider now the voltage at the junction point D as a result of the input signal 17 from the rectifier 11 alone.

In Figure 2 this voltage is illustrated by the wave form 20. Wave form 20 is simply a rectified signal in which the positive portions of the cycle are exactly in phase with the input signal 17.

When both the signal 19 and the positive half cycle signals 20 arrive at the point D, the resultant voltage output at point F is depicted by the wave form 21 in the last graph of Figure 2. This wave form includes pulses 22, corresponding in time phase to the peak portions of the input signal 17.

The curve 21 is obtained by combining the effects of the curves 19 and 20. It will be evident that curve 19 will raise the potential of point D to a value less than the potential of point C by the amount of the voltage drop across the variable resistance 15 and rectifier 16. The voltage at point D depicted by the curve 19 may be termed a control voltage which is slightly under the voltage at point C so that the rectifier 16 will normally be conducting. The voltage at point D will be increased above the voltage at C, however, whenever the upper portions of the positive half cycles of the wave form 20, derived from the input wave form 17, are greater than the voltage established by the wave form 19. In other words, only the peak portions of the input sine wave 17 can raise the voltage at point D higher than that depicted by the curve 19. Such an increase in the voltage at point D as a result of these peak values of the input wave will raise the total potential of the point D momentarily above the potential of point C thereby cutting off rectifier 16 and resulting in a discharge of the peak portion of the rectified wave form 20 through the resistance 14. The series of pulses 22, therefore represents the voltages generated across the resistance 14 as a result of these peak values discharging through this resistance.

The pulses 22 may be used to synchronize another signal or to control a gating circuit for passing portions of the input signal. The input signals, when simultaneously applied to such a gating circuit (not shown), may thus be chopped up in any manner desired. This control of the gating circuit is extremely accurate inasmuch as the pulses 22 correspond exactly in time phase to the peak portions of the input signal. Because of the fine synchronism of these pulses with the peak voltage points in any periodic signal, application of the pulses to synchronize a special gating circuit designad to pass only the maximum voltages attained by the periodic signal provides an extremely accurate system for measuring maximum or peak voltage values.

In the event the amplitude of the input signal 17 should vary, the control voltage at point D depicted by the curve 19 in the second plot of Figure 2 will also vary in a like manner so that pulses 22 will still be generated. In other words, the potential of point D will ordinarily remain below the potential of point C a given amount regardless of minor fluctuations in the overall amplitude of the input signal. The peak portion of the signal then will be the only portion that can raise the potential of point D above the potential of point C to cut off the rectifier 16 and result in the generation of the pulses 22. It will be clear, therefore, that the circuit of this invention will operate effectively notwithstanding variations in the amplitude of the input signal.

In the circuit of Figure 1, the width and amplitude of the pulses 22 may be controlled to a certain extent by varying the phase shift between the curve 18 and the input signal 17. This phase shift can be changed by changing the resistance of the rectifier 10 or the capacitance of the condenser 12 assuming that the frequency of the input signal is a constant. By varying this phase shift, the portion of the curve 19 which coincides with the peak portions of the positive half cycles 20 is changed. Because of the slope of the discharge portions of the curve 19, the amplitude of the control voltage at coincidence is, therefore, varied by this shift in phase, and a greater portion of the positive half cycles 20 may be passed across resistance 14 resulting in an increased pulse size.

The size of the pulses 22 can also be controlled to a certain extent by means of the variable resistance 15 which controls the amount that the point D is normally held below the potential of the point C. In effect, changing the resistance 15 also varies the amount of the peak portions of the half cycles 20 that are permitted to pass through the resistance 14 thereby generating the pulses 22. If resistance 15 is increased, the voltage drop depicted in the graph of Figure 2 between the curves 18 and 19 will be increased enabling a greater portion of the positive half cycles of the signals 20 to be passed through the resistance 14 thereby increasing the size of the pulses. By eliminating the variable resistance 13 entirely, the voltage drop between the points C and D will be only that due to the resistance of the rectifier 16 and thus only the very peak portion of the input signal 17 will result in a pulse 22, to provide an extremely accurate time phase relationship between the input voltage peak values and the pulses.

It is thus seen that the present invention provides an extremely simple and reliable circuit for generating a series of synchronizing pulses corresponding in time phase to the peak values of an input periodic signal. While a sine wave has been illustrated as an input signal, it should be understood that any cyclical signal having periodic peaks could be employed to generate a series of pulses corresponding to these peaks in exactly the same manner as in the case of the sine wave. Modifications of the circuit falling within the scope and spirit of the present invention will, therefore, occur to those skilled in the art. The principles of the network illustrated are thus not to be thought of as limited to the specific embodiment described and shown.

What is claimed is:

1. A synchronizing signal generator for providing synchronizing pulses corresponding in time phase to the peak voltage values in a periodic input signal, comprising, in combination: first and second rectifier means having their inputs connected to a common junction point to which said periodic input signal is applied; a condenser connected between the output of said first rectifier means and ground; a resistance connected between the output of said second rectifier means and ground; and a third rectifier means having its input connected to the junction point of said first rectifier means and said condenser and its output connected to the junction point of said second rectifier means and said resistance; said synchronizing pulses being generated across said resistance.

2. A generator according to claim 1, including a variable resistance in series with said third rectifier means.

3. A synchronizing signal generator for providing synchronizing pulses corresponding in time phase to the peak voltage values in a periodic input signal, comprising, in combination: first and second rectifier means having their inputs connected to a common junction point to which said periodic input signal is applied; a condenser connected between the output of said first rectifier means and ground; a first resistance connected between the output of said second rectifier means and ground; and a second resistance connected between the junction point of said first rectifier means and said condenser and the junction point of said second rectifier means and said first resistance; said synchronizing pulses being generated across said first resistance.

No references cited.